Figure 1:
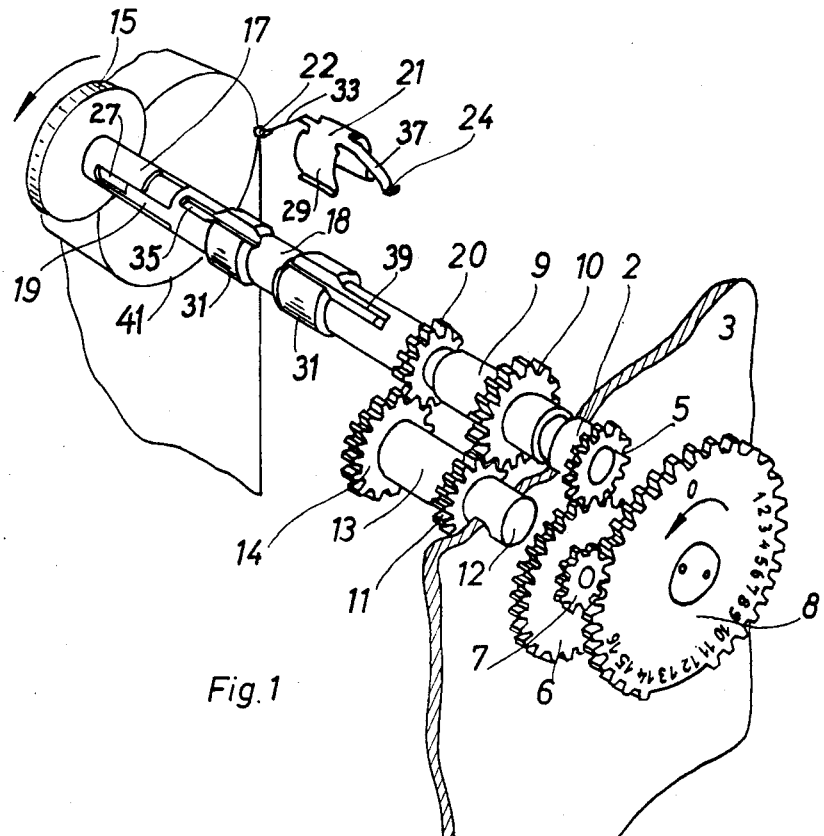

March 1, 1960 R. WEISS 2,926,424
ROLL FILM CAMERA WITH MULTI-FORMAT METERING MECHANISM
Filed July 8, 1958

United States Patent Office 2,926,424
Patented Mar. 1, 1960

2,926,424

ROLL FILM CAMERA WITH MULTI-FORMAT METERING MECHANISM

Richard Weiss, Braunschweig, Germany, assignor to Franke & Heidecke, Fabrik Photographischer Präzisions-Apparate, Braunschweig, Germany, a firm of Germany Application July 8, 1958, Serial No. 747,278

Claims priority, application Germany July 11, 1957

8 Claims. (Cl. 33—129)

The present invention relates to roll film cameras of the type in which the length of film travel, at each feeding movement of the film, is determined by film metering mechanism driven by a small measuring wheel which bears resiliently against the film (or its backing paper) and is turned by the advancing movement of the film. Such mechanism is well known in certain types of cameras, particularly in twin lens reflex cameras, which have a mirror reflex focusing view-finder chamber arranged above the picture-taking chamber in a common housing or casing.

It is frequently desired to use such a camera as a multi-format camera; that is, a camera which may be used to take pictures of different sizes. For example, the camera may have a maximum (and normally used) picture size of 2¼ x 2¼ inches, or 6 x 6 centimeters, and may take 12 exposures of this size on one roll of film. But it may be desired to take a larger number of smaller exposures, either upon a roll of film of the same kind, or on a roll of film of narrower width; e.g., 16 exposures of size 4 x 4 cm. or 4 x 5½ cm., or 24 exposures of size 28 x 40 mm. or size 24 x 36 cm. For these other picture sizes or "formats," the extent of feeding movement of the film, between successive exposures, will be different from that required for the normal or maximum size format, in accordance with the different dimensions of the pictures of different formats, measured in a direction lengthwise of the film. Since the length of the film feeding movement depends upon the operation of the metering mechanism (in the type of camera under discussion) either the metering mechanism or the drive for the metering mechanism must be altered, when changing from one format to another. Of course a format mask or adapter must be inserted in or removed from the camera, at or near the focal plane, but such masks and adapters are well known in themselves and the details thereof are not part of the present invention.

An object of the present invention, therefore, is the provision of generally improved and more satisfactory metering means for a roll film camera, to enable multi-format use thereof.

Another object is the provision of a new and improved multi-format roll film camera in which an interchangeable multi-format drive device is provided so that the same metering or counting mechanism is actuable to the required extent by two or more different lengths of film travel chosen at will, the drive device being of compact construction so that a minimum of space is taken up within the camera.

Yet another object is to provide a new and improved roll film camera of the multi-format type having an interchangeable drive mechanism for the metering or counting mechanism which is so arranged as to require a minimum of change in the parts of an existing camera.

A further object is to provide a new and improved drive and metering mechanism for a multi-format roll film camera which is simple while minimizing the danger of accidental change-over while the film is being transported.

Figure 2:
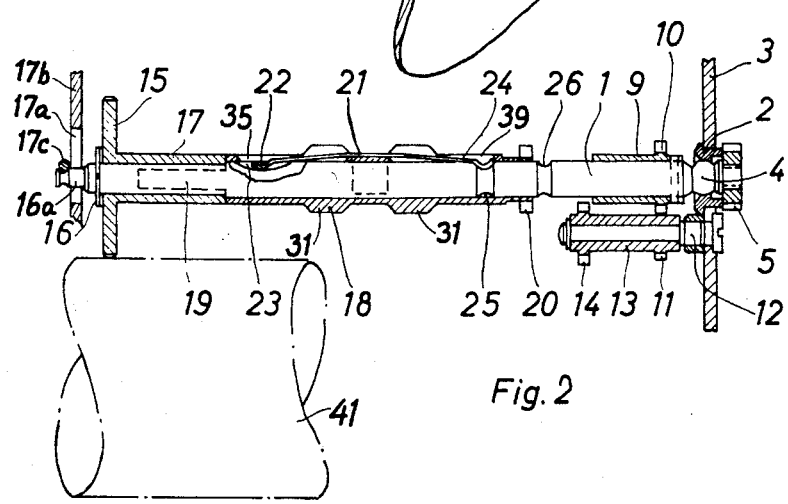

These and other desirable objects may be attained in the manner disclosed as an illustrative embodiment of the invention in the following description and in the accompanying drawing forming a part hereof, in which:

Fig. 1 is a perspective view of the interchangeable multi-format drive device according to the present invention showing its connection to the metering or counting mechanism at one side and its connection to a film spool at the other side; and Fig. 2 is a somewhat diagrammatic section taken longitudinally through the drive mechanism shown in Fig. 1.

The same reference numerals throughout the several views indicate the same parts.

While the present invention, at least in its simplest form, is not limited to any particular type or style of roll film camera, it is here disclosed by way of example in connection with a twin lens reflex camera of the kind identified by the trademark "Rolleiflex," manufactured by the firm of Franke & Heidecke, of Braunschweig, Germany, and widely known and used throughout the United States. The following disclosure of the invention presupposes familiarity with the main constructional features of the "Rolleiflex" camera, and for those not already familiar with the construction of this camera, reference may be made to the book "Rollei Photography, Handbook of the Rolleiflex and Rolleicord Cameras," by Jacob Deschin, published in 1952 by Camera Craft Publishing Company, of San Francisco, California.

In the copending United States patent application of Friedrich Sommermeyer, Serial No. 721,857, filed March 17, 1958, there is disclosed one solution of the problem of providing for multi-format film advance. That solution involves the use of interchangeable metering mechanism, taken out of the camera and replaced by a different metering unit when the format is changed. The present invention attacks the problem from a different approach, and employs the same identical and permanently mounted metering mechanism for all formats, the different lengths of film feed travel being accomplished by using shiftable transmission means such as shiftable gearing in the drive or transmission for driving the metering unit from the travel of the film.

The present invention can best be understood by referring first to a typical known form of metering mechanism and drive for the same, as disclosed in United States Patent 2,148,636, granted February 28, 1939, on the application of Muller and Priesemann. The mechanism disclosed in that patent corresponds approximately to the mechanism used in the above mentioned "Rolleiflex" camera.

With this known construction in mind, reference may now be made to the present drawings, and especially Fig. 2, showing a shaft 1 extending transversely through the camera and supported at either end by the camera housing, most of which is not here shown. At one end, the shaft 1 is rotatable within a bushing 2 carried by a fixed camera housing wall or plate 3, which bushing engages a spherical ball 4 fixed to or formed integrally with the shaft 1 and rotatably bearing on an arcuate surface extending inwardly on the bushing 2. These parts constitute, in effect, a ball and socket bearing rotatably supporting the shaft and also allowing it to swing or tilt to a limited extent. At its bearing end, a pinion 5 is fixed to the shaft 1 for rotation therewith. The pinion 5 meshes with a gear 6 having a smaller gear 7 fixed to and rotatable with it, the gear 7 in turn meshing with a film metering gear 8 which carries at its periphery a series of numbers for indicating frames of film. The film metering gears 6, 7, and 8 are mounted for rotation on suitable studs or shafts on the camera plate 3.

Secured to the shaft 1 near the ball 4 is a sleeve 9 which has fixed to it a gear 10, permanently in mesh with an output gear 11 mounted on an intermediate shaft 12. The intermediate shaft 12 is fixed at one end to the plate 3 and extends approximately parallel to the shaft. The gear 11 is fixed to a sleeve 13 rotatably mounted on the shaft 12, which sleeve 13 also carries another gear 14 spaced axially from the gear 11. As will be apparent later, the gear 14 is an input gear of the intermediate gearing arrangement comprising the gears 14 and 11.

The other end of the shaft 1 (that is, the end which is adjacent the left hand side wall of the camera body) rotatably carries a measuring wheel 15 formed integrally with a sleeve 17 rotatably mounted on the shaft and retained against leftward axial displacement thereon by a spring clip 16 of the split ring type (sometimes called a "circlip") which is seated in a circumferential groove in the shaft 1. Leftwardly of the clip 16, the shaft 1 has a cylindrical journal portion 16a rotatable in and also slidable along a slot 17a in a fixed plate 17b at the left side of the camera body. This slot 17a extends in a direction toward and away from the axis of the winding or take-up spool of the camera, the roll of film wound onto such spool being schematically indicated at 41. A resilient wire spring mounted on the outer face of the plate 17b has an arm 17c which presses against the shaft 1 in a direction to tend to move it along the guide slot 17a toward the film spool, so as to keep the measuring wheel 15 tightly engaged with the film 41 on the spool, notwithstanding the varying diameter of the roll of film as more and more film is wound onto the spool during the progress of the film feeding operation. There is, of course, an outer casing plate or housing plate at the left side of the camera, outside the plate 17b, so that the film is not fogged by stray light entering the exposure chamber through the slot 17a.

This resilient mounting of the left end of the shaft 1 is substantially the same as the resilient mounting employed in "Rolleiflex" cameras and is the same in principle (although different in structural details) as that shown in said Muller patent. The shaft 1 of the present application corresponds to the shaft 9 in said Muller patent, and the measuring wheel 15 of the present application corresponds to the measuring wheel 11 of said Muller patent, except that in the patent the measuring wheel is fixed to its shaft, whereas in the present application the measuring wheel is on a sleeve which is rotatable on the shaft. The pinion or gear 5 of the present application corresponds to the gear 13 in said patent, and just as is the case in said patent, the gear 5 serves to drive the film metering mechanism. In the present instance the gears 6, 7, and 8 are intended to indicate the metering mechanism only in a schematic way, for the present inventive concept is concerned with the transmission of motion in a selectively variable manner from the measuring or driving wheel 15 to the gear 5 which drives the metering mechanism, and the details of the metering mechanism itself, beyond the gear 5, are unimportant for present purposes. Thus the metering mechanism driven by the gear 5 may take substantially the form shown in Fig. 1 of the present drawings, where the extent of feeding movement to be imparted to the film between successive exposures is determined by observing the arrival of successive film frame numerals (on the gear 8) at an observation window, or it may take substantially the form shown in said Muller patent, where a notched disk (19 in said patent) is employed to stop the motion of the film feeding handle when the proper length of film has been fed.

As is customary, the measuring wheel 15 has a roughened or serrated periphery, so that it will be driven by the motion of the film roll 41 and will not slip thereon. Turning now to the preferred form of selectively variable transmission between the wheel 15 and the pinion 5, there is a second sleeve 18 carried by and rotatable on the shaft 1, rightwardly of the previously mentioned sleeve 17. The sleeve 18 is axially shiftable on the shaft 1, the sleeves 9 and 17 serving as stops or abutments to limit the extent of axial shifting. The sleeve 18 is coupled to the sleeve 17 to turn therewith in all axial positions of the sleeve 18. To this end, the sleeve 18 has a pair of opposing axially extending tongues 19 slidably disposed within a pair of opposing grooves or slots 27 carried by the sleeve 17. Secured to the other or right hand end of the sleeve 18 is a gear 20. The gear 20 is movable between a position out of engagement with the gear 14 as shown in Fig. 2 and another position meshing with the gear 14 as shown in Fig. 1. The gear 20 is removably latched in either one of these positions by means of a latch acting between the shaft 1 and the sleeve 18.

This latch is provided by a spring clip 21 having a pair of downwardly extending centrally disposed sleeve portions 29 which clip over the sleeve 18 and are restrained from lateral movement by a pair of spaced knuckles or circumferential ribs 31. The latch 21 has a leftwardly extending spring arm 33 having a downwardly looped end portion 22. The arm 33 extends into a groove or slot 35 in the sleeve 18. The end 22 of the clip projects downwardly and is spring biased into a longitudinally extending groove or keyway 23 in the shaft 1. As can be seen in Fig. 2, with the clip end 22 within the groove 23, the measuring wheel 15 is coupled to the shaft 1 to form a direct drive for the pinion 5 carried by the end of the shaft 1.

The other end of the clip 21 has a rightwardly extending spring arm 37 having a looped end 24. The arm 37 is disposed within a longitudinally extending groove or slot 39 in the sleeve 18, the end 24 extending downwardly and being biased into engagement with a circumferential groove 25 in the shaft 1. Another circumferential groove 26 is provided on the shaft 1 spaced from the groove 25 in the direction of the gear 14 and is so located that when the clip end 24 snaps into engagement with the groove 26, the gears 20 and 14 are in mesh. In this position of the sleeve 18 and clip 21, as can be seen in Fig. 2, the measuring wheel 15 is directly coupled to the sleeve 18 and gear 20, the pinion 5 being indirectly driven by means of the intermediate gear train 14, 11, and 10.

The diameters of the gears 10, 11, 14, and 20 are so chosen as to produce the desired ratio of revolutions of the wheel 15 to the revolutions of the pinion 5, depending upon the film format to be used. Conveniently the gears 20 and 11 may be of approximately the same diameter, and the gears 14 and 10 may also be of approximately the same diameter as each other but of larger diameter than the gears 20 and 11. Whether the drive be directly through the shaft 1 to the pinion 5 or indirectly through the intermediate gearing arrangement to the pinion 5, the film metering gear 8 is turned a like amount for the two different film sizes so that a single set of frame indication numbers on the gear 8 suffices for both film sizes.

To review the operation, the sleeve 18 is located in one or another of its axial positions on the shaft 1 according to the film format size which it is desired to use. For the smaller film size, the sleeve 18 is located in its left hand position as shown in Fig. 2, with the end 22 of the clip 21 engaged in the groove 23 on the shaft 1. In this position of the sleeve 18, the gear 20 is out of engagement with the intermediate gear 14. Rotation of a film spool 41 which bears on the measuring wheel 15 likewise rotates the sleeves 17 and 18 joined for corotation by the tongues 19 and grooves 27. Inasmuch as the clip 21 is movable with the sleeve 18 and in view of the engagement of the clip end 22 in the groove 23, the clip end 22 acts like a shaft key and the shaft 1 is caused to rotate also. The pinion 5 is thus driven directly by the rotation of the shaft 1, so that the film metering mechanism (whether in the form of the gears 6, 7, and 8, or in any other form) is turned in the required ratio to the travel of the film.

When the camera is to be used with a larger film format, so that the metering disk 8 should be turned to the same angular extent by a larger length of film travel, the back of the camera is opened up, and the operator reaches in and grasps the sleeve 18 between his thumb and finger, and moves it axially to the right. This pulls the resilient arm 22 out of the keyway or slot 23 and puts it on a smooth part of the periphery of the shaft 1. It also shifts the resilient arm 24 out of the circumferential groove 25 and puts it in the shaft groove 26. In this position the gears 20 and 14 are in mesh and the sleeve 18 is rotatable relative to the shaft 1. When the film spool 41 is rotated by the advance of the film, the measuring wheel 15, sleeve 17, and sleeve 18 are rotated by a like amount. The drive now takes place through the gear 20, the intermediate input gear 14, the intermediate output gear 11, and the gear 10 is carried by the sleeve 9 fixed to the shaft 1. Thus, for the larger film size the intermediate gearing comes into operation to accomplish a like rotation of the pinion 25 and the film metering gear 8 through the intermediate gears 6 and 7. Because of the intermediate gear arrangement, a longer film travel is required in order to rotate the pinion 5 through the same angular extent that it would be rotated by a shorter film travel if the wheel 15 were directly coupled to the shaft 1 (i.e., with the sleeve 18 in its left hand position). Thus the same metering mechanism may be used for both formats.

Of course when changing the selective transmission by moving the sleeve 18 in one direction or the other, it is necessary to insert or remove (as the case may be) an appropriate format mask at the focal plane, but as explained above this is known per se and is not part of the present invention.

The mechanism for moving the film to advance or feed it, is known per se and need not be specially dealt with herein. For example, the film may be fed by operation of a knob or a hand crank like the crank 4 in said Muller patent.

An interchangeable drive and metering mechanism according to the present invention is simple and is so arranged as to minimize the danger of accidental changeover during the film travel. It is furthermore designed to require a small amount of space within a crowded camera housing and may be easily substituted for parts similarly disposed in an existing camera model.

Although a mechanism has been described for use with two different formats or film sizes, it is to be understood that it may be utilized for three or more film sizes by adding additional intermediate gears similar to the gears 14 and by providing for additional displaced positions of the sleeve 18.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A film metering mechanism for a multi-format roll film camera comprising a shaft, film metering means operatively connected to said shaft, a measuring wheel rotatably carried by said shaft and adapted to be rotated by advancing movement of a film, means for directly driving said shaft and film metering means upon rotation of said measuring wheel by a film, intermediate gearing means, and means for driving said shaft and film metering means through said intermediate gearing means upon rotation of said measuring wheel by a film, so that said metering means may be driven through a predetermined extent by one extent of advancing movement of a film when said direct driving means is effective and by a different extent of advancing movement of a film when said intermediate gearing means is effective.

2. A film metering mechanism for a multi-format roll film camera comprising a shaft having a pinion secured thereto, film metering gear means in operative engagement with said pinion, a measuring wheel rotatably mounted on said shaft and adapted to be rotated by advancing movement of a film, disengageable means for directly driving said pinion upon rotation of said measuring wheel, intermediate gearing means, and disengageable means for indirectly driving said pinion through said intermediate gearing means upon rotation of said measuring wheel, so that said metering means may be driven through a predetermined extent by one extent of advancing movement of a film when said first mentioned disengageable means is engaged and said second mentioned disengageable means is disengaged, and may be driven through the same extent by a different extent of advancing movement of a film when said second mentioned disengageable means is engaged and said first mentioned disengageable means is disengaged.

3. A film metering mechanism for a multi-format roll film camera comprising a shaft having a pinion secured to one end, a film metering gear in operative engagement with said pinion, a measuring wheel rotatably mounted on the other end of said shaft and engaging a film so as to be rotated by advancing movement thereof, means for directly driving said shaft and pinion by rotation of said measuring wheel when making exposures of one format size on said film, intermediate gearing means, and means for indirectly driving said shaft and pinion through said intermediate gearing means by rotation of said measuring wheel when making exposures of a different format size on said film.

4. A metering mechanism for a multi-format roll film camera comprising a shaft having a pinion secured thereto near one end thereof, a film metering gear in operative engagement with said pinion, a measuring wheel rotatably mounted on said shaft near the other end thereof and engaging a film so as to be rotated by advancing movement thereof, a sleeve rotatable with said measuring wheel and axially movable relative thereto, intermediate gearing means, means for latching said sleeve to said shaft in one position of said sleeve to drive said pinion directly upon rotation of said measuring wheel by movement of a film when making exposures of one format size on said film, and means effective in another position of said sleeve for indirectly driving said pinion through said intermediate gearing means upon rotation of said measuring wheel by movement of a film when making exposures of a different format size on said film.

5. A metering mechanism for a multi-format roll film camera comprising a shaft having a pinion secured thereto near one end, a film metering gear in operative engagement with said pinion, a measuring wheel rotatably mounted on said shaft and engaging a film so as to be rotated by movement of said film, a sleeve rotatable with said measuring wheel and axially movable relative thereto, a gear carried by said sleeve, another gear rotatable with said shaft, a pair of intermediate gears mounted for rotation about an axis in fixed relation to said shaft, one of said intermediate gears being meshed with said gear rotatable with said shaft, means for latching said sleeve to said shaft in a first position of said sleeve in which said gear carried by said sleeve is disengaged from said intermediate gears, to drive said pinion directly upon rotation of said measuring wheel by a film, to meter said film for an exposure format of one size, and means effective upon longitudinal movement of said sleeve from said first position to a second position for unlatching said sleeve from said shaft and for engaging said gear carried by said sleeve with the other one of said intermediate gears, to drive said pinion through said intermediate gears upon rotation of said measuring wheel by a film, to meter said film for an exposure format of a different size.

6. A construction as defined in claim 5, in which said means for latching said sleeve to said shaft comprises a slot in said sleeve, a slot in said shaft, and a resilient spring member having an arm extending into both of said slots.

7. A construction as defined in claim 6, further including two axially spaced circumferential grooves in said shaft, said spring member having an arm extending into one of said grooves when said sleeve is in said first position and extending into the other of said grooves when said sleeve is in said second position, to tend to resist longitudinal movement of said sleeve.

8. A construction as defined in claim 5, further including a resilient spring member mounted on said sleeve, and two axially spaced circumferential grooves in said shaft, said spring member having an arm extending into one of said grooves when said sleeve is in said first position and extending into the other of said grooves when said sleeve is in said second position, to tend to resist longitudinal movement of said sleeve.

References Cited in the file of this patent

UNITED STATES PATENTS

| | | |
|---|---|---|
| 1,679,899 | Goss | Aug. 7, 1928 |
| 2,148,636 | Muller et al. | Feb. 28, 1939 |
| 2,528,840 | Mitchell | Nov. 7, 1950 |